June 29, 1937.  M. P. YOUKER  2,085,623
PROCESS FOR MANUFACTURING MOTOR FUELS
Filed Dec. 7, 1931
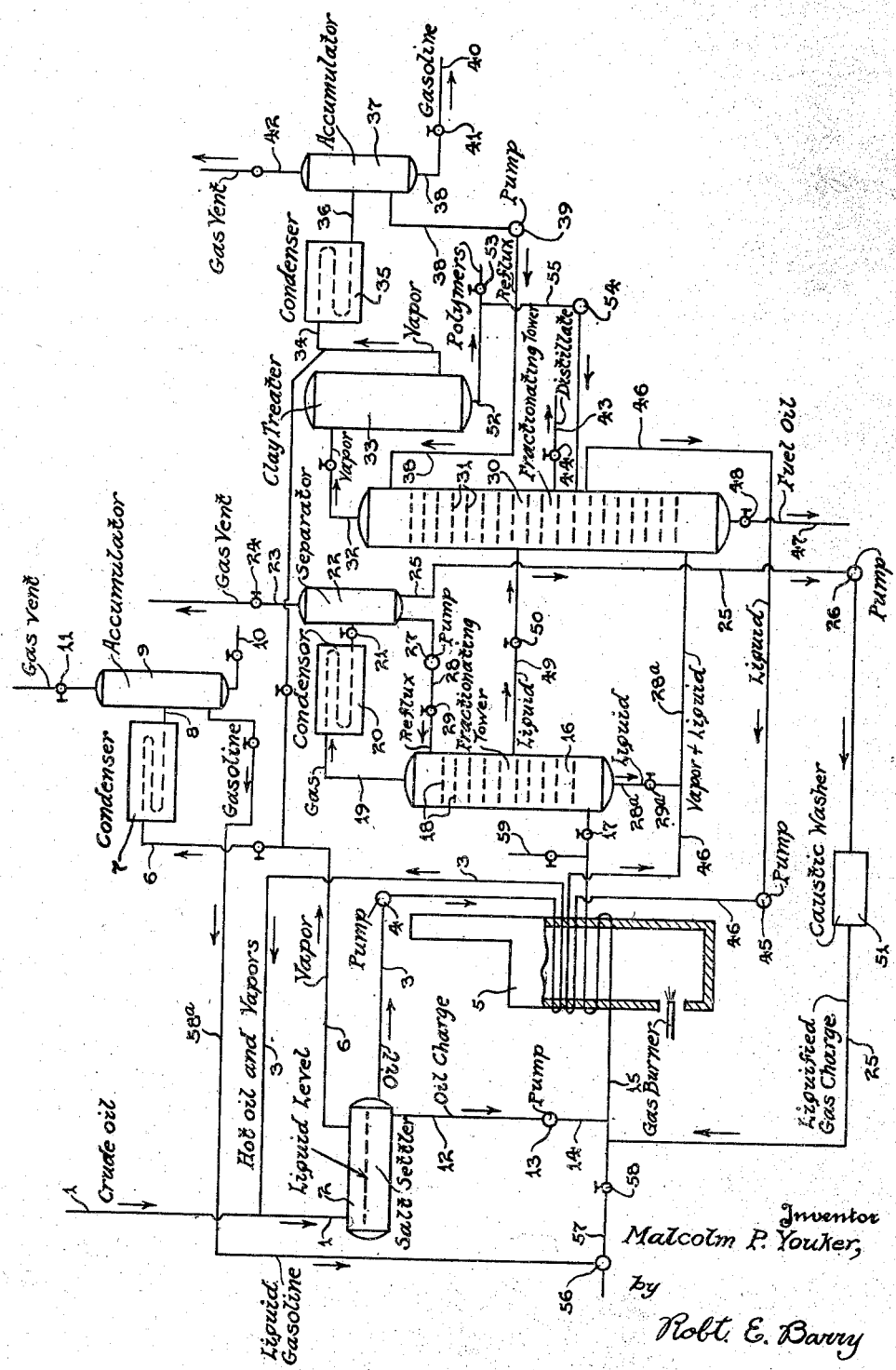
Inventor
Malcolm P. Youker,
by
Robt. E. Barry
Attorney Patented June 29, 1937

2,085,623

UNITED STATES PATENT OFFICE 2,085,623

PROCESS FOR MANUFACTURING MOTOR FUELS

Malcolm P. Youker, Bartlesville, Okla., assignor to Phillips Petroleum Company, Bartlesville, Okla., a corporation of Delaware Application December 7, 1931, Serial No. 579,538

2 Claims. (Cl. 196—66)

This invention relates to improvements in processes for converting hydrocarbon liquids or gases.

An object of the invention is to provide a process by which gasoline having a high anti-knock rating and other desirable qualities, may be manufactured directly from crude oil.

Another object is to minimize the losses due to conversion of liquids to gases which normally result from the conversion of heavy hydrocarbon liquids to lighter hydrocarbon liquids.

These desirable ends, as well as others are attained by the process.

With the foregoing objects outlined and with other objects in view which will appear as the description proceeds, the invention consists in the novel features hereinafter described in detail, illustrated in the accompanying drawing, and more particularly pointed out in the appended claims.

The form of apparatus by which my new process is carried out is illustrated in elevation on the accompanying drawing.

Crude oil will be delivered through the pipe 1 into the salt settler 2 which is a horizontal cylindrical tank. A liquid level normally above the center of the salt settler 2 will be maintained. Liquid will be delivered from the tank 2 through the pipe 3 by means of the pump 4 through a furnace 5 and into the pipe 1. The liquid thus delivered through pipe 3 will be heated in passing through the furnace 5 and being delivered into the pipe 1, will mix with and heat the crude oil flowing through the pipe 1 into the salt settler 2. As a result of heating the crude oil entering the salt settler 2, vapors will be generated therein, and these vapors will flow through the pipe 6 into condenser 7. Condensate will flow from the condenser 7 through the pipe 8 into the accumulator 9. The temperature maintained in the salt settler 2 will be insufficient to crack the oil and only such that gasoline vapors distilled therefrom will flow into the condenser 7, and therefore, gasoline only will be accumulated in the accumulator 9. Gasoline may be withdrawn from the accumulator 9 through the valved pipe 10. Gases will be vented from the accumulator 9 through vent pipe 11. Liquid will be withdrawn from the salt settler 2 through a pipe 12 by a pump 13 and will be delivered by pump 13 through pipe 14 and thence through a heating tube 15 which passes through furnace 5 and delivers into the lower portion of fractionating tower 16. A valve 17 which is mounted in heating tube 15 between furnace 5 and fractionating tower 16 will be utilized to maintain pressure in heating tube 15. Liquid which is passed through the heating tube 15 will be heated therein and will, upon entry into the fractionating tower 16 to a large extent vaporize, and the vapors thus generated will flow upward through the fractionating tower 16 and bubble trays 18, and thence through pipe 19 and condenser 20 and pipe 21 into the gas liquid separator 22.

Gas which will accumulate in the separator 22 in gaseous condition, will be vented therefrom through the pipe 23 in which is mounted a valve 24. A part of the gas which will accumulate in liquid state in the separator 22 will be pumped therefrom through the pipe 25 by means of the pump 26 into and through heating tube 15. A part of the liquefied gas which will accumulate in the separator 22 will be delivered thence by pump 27 through pipe 28 in which is mounted valve 29 into the top of fractionating tower 16. As a result of delivering said liquid through pipe 28 into the top of fractionating tower 16, liquid reflux will flow downward through fractionating tower 16 over bubble trays 18 and will contact and condense a portion of the vapors which will rise through fractionating tower 16, and as a result of said condensation, liquid, consisting of gasoline and heavier fluid, will accumulate in the fractionating tower 16. Liquid which will collect in the bottom of fractionating tower 16 will flow thence through pipe 28a in which is mounted a valve 29a into a fractionating tower 30 at a point below the bubble trays 31 which are mounted in fractionating tower 30.

Pressure will be maintained in fractionating tower 16 in excess of the pressure which will be maintained in the fractionating tower 30, and as a result, liquid flowing from fractionating tower 16 through pipe 28a into fractionating tower 30, will partially vaporize upon entry into fractionating tower 30, and vapors thus generated will flow upward through bubble plates 31 in fractionating tower 30, and thence through pipe 32, clay treater 33, pipe 34, and condenser 35. Condensate will flow from condenser 35 through pipe 36 into accumulator 37.

A sufficient quantity of the liquid which will gather in the accumulator 37 will be pumped therefrom through pipe 38 by means of pump 39 into the top of fractionating tower 30 to maintain a temperature at the top of fractionating tower 30 such that only gasoline vapors and lighter gases will pass therefrom to the condenser 35. Thus, gasoline and gas only will be delivered into the accumulator 37.

Gasoline will be withdrawn from accumulator 37 through the pipe 40 in which is mounted valve 41. Gas will be vented from accumulator 37 through vent pipe 42. As a result of introducing cold gasoline into the top of fractionating tower 30, reflux liquid will flow downward over bubble plates 31 and will condense that part of the vapors rising through fractionating tower 30 which is heavier than gasoline. Distillate which is heavier than gasoline may be withdrawn from one of the bubble trays 31 which is intermediate between the point of entry of pipe 28a in fractionating tower 30, and the top of fractionating tower 30, through a pipe 43 in which is mounted a valve 44. Distillate will be delivered by a pump 45 from one of the bubble plates 31 through a pipe 46 which will pass through furnace 5 and lead into the pipe 28a.

The liquid which will be passed through pipe 46 will be heated in passage through furnace 5 and will, upon entry into the pipe 28a, heat the liquids which will flow from the fractionating tower 16 through the pipe 28a.

Fuel oil will be withdrawn from the bottom of fractionating tower 30 through pipe 47 in which is mounted valve 48. A pipe 49 in which is mounted a valve 50 will serve to conduct liquid from an intermediate one of the bubble trays 18 in fractionating tower 16 into fractionating tower 30 at a point above the entry point of pipe 28a into fractionating tower 30.

A body of fuller's earth will be so disposed in the clay treater 33 that vapors may readily flow through this body of clay and intimately contact the particles thereof. Polymerized hydrocarbon liquids which will be formed in the clay treater 33 as a result of the contact between vapors and fuller's earth therein, will be withdrawn therefrom through a pipe 52 in which is mounted a valve 53. These polymerized hydrocarbons may either be withdrawn to storage or they may be delivered by means of a pump 54 which is mounted in a pipe 55 into fractionating column 30.

A conventional caustic washer 51 is mounted in the pipe 25 and serves to remove hydrogen sulfide and other impurities from the liquefied gas which flows through the pipe 25.

A pump 56 is mounted in a pipe 57 in which is mounted a valve 58 and which leads into heating tube 15 by means of which straight run gasoline, hydrocarbon gas, either in liquid or gaseous form, fuel oil, or any other hydrocarbon material or treating agent may be introduced into and passed through the heating tube 15. I may elect to deliver gasoline collected in the accumulator 9 and into and through the heating tube 15, by means of the pump 56 and the valved pipe 58a.

Water or water containing treating agents, either in suspension or in solution, or treating agents alone, may be introduced through valved pipe 59 into the heated hydrocarbon which will flow from the furnace through heating tube 15 into fractionating tower 16.

Crude oil being preheated and delivered into salt settler 2 will flow slowly through this salt settler and any salt contained in the crude, as well as other debris will be settled from the crude therein and will be periodically removed.

The pressure maintained in the salt settler 2 will be only that which is set up therein by resistance to flow of vapors through the pipe 6 and the condenser 7. Although good results may be obtained at lower pressures, I will preferably maintain a pressure of approximately 3000 pounds per square inch in the heating tube 15. Normally, the pressure set up at the discharge of the pumps 13 and 26 will be 3000 pounds per square inch, and pressure taken at intermediate points along the heating tube 15 will be less than 3000 pounds per square inch by the amount of friction heat between the point of which such pressure is taken and said pumps. A pressure of between 200 pounds per square inch and 1000 pounds per square inch, preferably about 500 pounds per square inch, will be maintained in the fractionating tower 16, the separator 22, the condenser 20, and inter-connecting pipes.

The pressure maintained in the fractionating column 30, the clay treater 33, the condenser 35 and inter-connecting lines will be only in excess of atmospheric pressure, to the extent that pressure is set up by reason of the resistance to flow of vapors and condensate through this system, as the accumulator 37 will be operated at approximately atmospheric pressure.

The length of that part of the pipe 3 which will be exposed to heat in the furnace 5 will be so proportioned that the liquid which will enter the salt settler 2 will be heated to about 250° F. Therefore, nothing heavier than gasoline will be vaporized in the salt settler 2.

By regulation of the quantity of fuel fired in the furnace 5, the temperature to which the liquid passed through heating tube 15 will be heated, will vary between 800° F. and 900° F., and this temperature will preferably be between 845° F. and 865° F. The temperature maintained at the top of the fractionating tower 16 by means of regulating the delivery of reflux liquid into the top of this tower will be such that the vapor pressure of the liquid leaving the bottom of this fractionating tower will be in accord with the current specifications for motor fuel, which at this time, vary between 8 pounds per square inch and 13 pounds per square inch when taken by the Reed method at 100° F. That part of the pipe 46 which will be exposed to heat in the furnace 5 will be so proportioned that the bottom of the fractionating tower 30 will be heated to the extent necessary to remove from the liquids which will collect in the bottom of fractionating tower 30 practically all gasoline fractions.

While I have not shown any details pertaining to the exact arrangement of the heating tube 15, it should be understood that I intend to arrange this heating tube in the form of a heating portion and a conversion portion after the manner which has already been disclosed in my patent applications: Serial No. 559,083, filed Aug. 24, 1931, Serial No. 545,309, filed June 18, 1931, and Serial No. 579,044, filed Dec. 4, 1931.

As outlined in the above mentioned applications for patents, in order to avoid rapid deposition of coke in the apparatus and to at the same time obtain satisfactory conversion in the heating tube 15 of the materials passed therethrough, it is desirable to first rapidly heat these materials to conversion temperature in the first part of the heating tube 15 and then pass the thus heated material through a latter portion of the heating tube 15 which is so arranged in the furnace as to be only mildly heated.

As a result of the method of operation, this process will produce gasoline having a very high anti-knock rating. This fact was divulged in a previous application for patent filed by the present applicant under U. S. application Serial No. 534,067, filed April 30, 1931.

From the foregoing it is believed that the construction, operation and advantages of my invention may be readily understood by those skilled in the art, and I am aware that changes may be made in the details disclosed, without departing from the spirit of the invention, as expressed in the claims.

What I claim and desire to secure by Letters Patent is:

1. A process for manufacturing from crude oil, motor fuel having a high anti-knock rating, which comprises preheating said crude oil below cracking temperatures and removing gasoline vapors from the same, condensing gasoline vapors and thereby obtaining a gasoline condensate, heating the remainder of said preheated oil to a cracking temperature under high super-atmospheric pressure, separating the hydrocarbon material which results from said heating into a lighter than gasoline fraction, a gasoline fraction, and a heavier than gasoline fraction, liquefying said lighter than gasoline fraction, and adding some of the gasoline condensate and some of said lighter than gasoline fraction in liquid phase to said remainder of the preheated oil before heating the latter to a cracking temperature.

2. A process for manufacturing from crude oil, motor fuel having a high anti-knock rating, which comprises preheating said oil below cracking temperatures and removing gasoline vapors from the same, condensing said vapors to obtain a gasoline condensate, then heating the remainder of said preheated oil to a cracking temperature under high super-atmospheric pressure, separating the hydrocarbon material which results from said heating and thereby obtaining a lighter than gasoline fraction in liquid condition, a gasoline fraction and a heavier than gasoline condensate fraction, adding some of said first mentioned gasoline and some of said lighter than gasoline fraction to said remainder of the preheated oil before heating the latter to a cracking temperature, and removing hydrogen sulphide and other impurities from said lighter than gasoline fraction before adding the latter in liquid condition to said remainder of the preheated oil.

MALCOLM P. YOUKER.